(12) United States Patent
Ricci

(10) Patent No.: US 10,063,697 B2
(45) Date of Patent: Aug. 28, 2018

(54) HOME COMMUNICATION CENTER

(75) Inventor: Christopher P. Ricci, Denver, CO (US)

(73) Assignee: Flextronics AP, LLC, San Jose, CA (US)

( * ) Notice: Subject to any disclaimer, the term of this patent is extended or adjusted under 35 U.S.C. 154(b) by 1361 days.

(21) Appl. No.: 13/554,735

(22) Filed: Jul. 20, 2012

(65) Prior Publication Data

US 2013/0023254 A1 Jan. 24, 2013

Related U.S. Application Data

(60) Provisional application No. 61/510,934, filed on Jul. 22, 2011.

(51) Int. Cl.
| | |
|---|---|
| *H04M 3/42* | (2006.01) |
| *H04W 88/16* | (2009.01) |
| *H04M 1/725* | (2006.01) |
| *H04W 88/06* | (2009.01) |
| *H04M 15/00* | (2006.01) |
| *H04M 3/436* | (2006.01) |

(52) U.S. Cl.
CPC ...... *H04M 3/4234* (2013.01); *H04M 1/72519* (2013.01); *H04M 3/436* (2013.01); *H04M 15/55* (2013.01); *H04M 2215/725* (2013.01); *H04W 88/06* (2013.01); *H04W 88/16* (2013.01)

(58) Field of Classification Search
CPC ..... H04W 88/06; H04W 88/16; H04M 15/55; H04M 1/72519; H04M 2215/725; H04M 3/436

USPC .................... 455/414.1, 417, 426.1
See application file for complete search history.

(56) References Cited

U.S. PATENT DOCUMENTS

| | | | | |
|---|---|---|---|---|
| 5,673,308 A | * | 9/1997 | Akhavan ................ | H04W 4/16 455/417 |
| 2003/0134630 A1 | * | 7/2003 | Scheinert ............... | H04W 84/14 455/422.1 |

(Continued)

FOREIGN PATENT DOCUMENTS

| | | |
|---|---|---|
| CN | 1274229 | 11/2000 |
| CN | 1767664 | 5/2006 |

(Continued)

OTHER PUBLICATIONS

Notice of Allowance (with English translation) for Chinese Patent Application No. 201210395496.8, dated May 31, 2017, 5 pages.

*Primary Examiner* — Jaime Holliday
(74) *Attorney, Agent, or Firm* — Sheridan Ross P.C.

(57) ABSTRACT

Methods, systems, devices, modules, and/or computer instructions for redirecting calls in a home communication center are provided. More particularly, a home communication center can include a femtocell, a DECT interface, and/or a network interface. The home communication center can register one or more cellular communication devices with the home communication center; receive, from the femtocell, a call directed to one of the cellular communication devices; determine if a redirection rule applies to the call; if a redirection rule applies to the call, determine a DECT phone to receive the call; determine a phone number for the DECT phone; and, send the call to the DECT interface to call the phone number of the DECT phone.

16 Claims, 8 Drawing Sheets

(56) References Cited

U.S. PATENT DOCUMENTS

| | | | | |
|---|---|---|---|---|
| 2006/0013254 A1* | 1/2006 | Shmueli | ............... | H04L 45/30 370/466 |
| 2007/0287438 A1* | 12/2007 | Hansen | ............... | H04M 3/54 455/417 |
| 2008/0204978 A1* | 8/2008 | Haspil | ............... | H04M 1/6041 361/601 |
| 2010/0144341 A1* | 6/2010 | Robbins | ............... | H04W 4/16 455/426.1 |
| 2011/0047581 A1* | 2/2011 | Caspi | ............... | H04L 12/66 725/80 |
| 2011/0222549 A1* | 9/2011 | Connelly | ............... | G06F 8/65 370/401 |

FOREIGN PATENT DOCUMENTS

| | | |
|---|---|---|
| CN | 1997048 | 7/2007 |
| CN | 101064929 | 10/2007 |

* cited by examiner

HOME COMMUNICATION CENTER

REFERENCE TO RELATED APPLICATIONS

The present application claims the benefits of and priority, under 35 U.S.C. § 119(e), to U.S. Provisional Application Ser. No. 61/510,934, filed Jul. 22, 2011, entitled "HOME COMMUNICATION CENTER," of which the entire disclosure is incorporated by reference herein for all that it teaches and for all purposes.

BACKGROUND

There are various communication possibilities for customers today. Those possibilities include cellular phones, landline phones, video phones, etc. Unfortunately, these devices seem to be diverging rather than converging. Thus, in any one person's home, a person may have a landline phone, a wireless phone, cellular phones, an Internet connection, etc. There are many users starting to give up their landline connections and use purely cellular phones for communications. However, cellular phones often have network problems or reception issues.

Further, cellular communications at a home may be subject to interference due to the structure of the house, the location of the house in a rural or a suburban area, etc. Thus, to mitigate the problems with cellular phone connections, some people maintain their landline phones. However this trend tends to be an added expense for the user. Further, there is no integration of the cellular and landline systems. Thus, cellular phones may have their own call log and voicemail history, where the landline phones have a separate call log and voicemail history. Further, the cell phones are typically associated with single persons, while the landline phones, at a house, are associated with a family or multiple users. Thus, you may call the landline phone to reach any person within the family. In contrast, a person can call one number to reach a single person who may be associated with that cell phone. These different issues with integration and the expense of communication in today's society remain a problem.

The term "Digital Enhanced Cordless Telecommunications (DECT)" as used herein refers to digital communication standard, which is primarily used for creating cordless phone systems. DECT is used primarily in home and small office systems, but is also available in many PBX systems for medium and large businesses. DECT can also be used for purposes other than cordless phones, such as, baby monitors. Data applications also exist. DECT is further described in the ETS 300-175 series defining the air interface and ETS 300-176 defining how the DECT units should be type approved. A technical report, ETR-178, entitled "Digital Enhanced Cordless Telecommunications (DECT); A high level guide to the DECT standardization" by the European Telecommunications Standards Institute in 1997, was also published to explain the standard. All of these publications and their progeny are incorporated herein by reference for all that they teach and for all purposes.

The term "DECT phone" or "DECT device" as used herein refers to any cordless device that can communicate wirelessly over a short range. In some embodiments, the term refers to at least one handset associated with one base station and one phone line socket. The base station allows several cordless telephones to be placed around the house or building, all of which can operate from the same telephone jack. Additional handsets may have a battery charger station, which does not plug into the telephone system. Handsets can, in embodiments, be used as intercoms, communicating between each other, and sometimes as walkie-talkies, intercommunicating without the telephone line connection.

The term "cellular communication device" as used herein refers to any mobile device that can make and receive telephone calls over a radio link whilst moving around a wide geographic area. The cellular communication device communicates by connecting to a cellular network provided by a mobile phone operator, allowing access to the public telephone network. By contrast, a cordless telephone (e.g., a DECT phone) is used only within the short range of a single, private base station. In addition to telephony, modern cellular communication devices may also support a wide variety of other services such as text messaging, Multimedia Messaging Service (MMS), email, Internet access, short-range wireless communications (infrared, BLUETOOTH™), business applications, gaming and photography.

The term "femtocell" as used herein refers to a small, low-power cellular base station. The femtocell may be used in a home or small business. In embodiments, the femtocell can connect to a service provider's network via a broadband connection (such as Digital Subscriber Line (DSL) or cable system). Current designs for the femtocell may support two to four active mobile phones in a residential setting, and eight to 16 active mobile phones in enterprise settings. A femtocell allows service providers to extend service coverage indoors or at the cell edge, especially where access would otherwise be limited or unavailable.

The term "redirection" as used herein refers to any process where a communication, whether voice, data, or other communication, is sent to a different device than that to which the communication was directed.

The term "redirection rule" as used herein refers to any directive, whether automated or user-defined, which defines how a home communication center should redirect a received communication.

The term "communication device" as used herein refers to any device capable of conducting a communication, whether with data, voice, or video. The communication device may include cellular devices and/or DECT devices.

The term "phone call" as used herein refers to any communication session that may include voice, video, and/or data. The phone call can generally include an initiator that begins the communication session, a recipient to which the communication session is directed, and possible other participants.

The term "metadata" as used herein refers to data providing information about one or more aspects of the data. Metadata can include structural metadata that describes the design and specification of data structures, and descriptive metadata, which can describe individual instances of application data or the data content. Metadata can be stored and managed in a database, often called a Metadata registry or Metadata repository. A communication session, a device, and other modules, data, devices described herein may have one or more items of metadata associated therewith.

The term "target" as used herein refers to the recipient device as identified in a communication session initiation and/or metadata. The target can be a cellular device, a DECT device, or some other device or system.

The term "address" as used herein refers to the identifier for a recipient device as identified in a communication session initiation and/or metadata. The address can be associated with a cellular device, a DECT device, or some other device or system. Thus, the address can be a phone number, a uniform resource identifier (URL), a LAN or WAN address, etc.

The term "network" as used herein refers to a collection of devices, systems, computers, and other hardware components interconnected by communication channels that allow sharing of resources and information. Where at least one process in one device is able to send/receive data to/from at least one process residing in a remote or physically-separate device, then the two devices are said to be in a network. Simply, more than one device interconnected through a communication medium for information interchange is called a network.

The terms "communicatively coupled" or "in communication with" as used herein refers to any connection, whether wired or wireless, that allows at least two devices to share information. In embodiments, when at least two devices are communicatively coupled or in communication with each other, the devices are part of a network.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module" as used herein refers to any known or later developed hardware, software, firmware, artificial intelligence, fuzzy logic, or combination of hardware and software that is capable of performing the functionality associated with that element.

The terms "determine", "calculate" and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

SUMMARY

Embodiments described herein include computer executable instructions to register one or more communication devices with a home communication center. The home communication center can receive metadata associated with a call directed to one of the registered communication devices. Based on the metadata, the home communication center can determine if a redirection rule applies to the call and, if a redirection rule does apply to the call, determine a new target (e.g., a different device connected to or registered with the home communication center) for the call. The home communication center may then determine an address for the new target and send the call to the address of the new target.

In other embodiments, a home communication center includes a femtocell to send or receive cellular communications, a DECT interface to send or receive wireless phone communications, and/or a network interface operable to send or receive communications over a landline. Further, the home communication center may also include a video/audio input/output that can receive video and/or audio signals for a call and provide audio signals to a speaker for a user. The home communication center may also include a connector/charger that can physically connect with a cellular phone and/or communicatively couple with the cellular phone to charge the cellular phone. In embodiments, the home communication center can function as a computing system with a memory and a processor. The processor may communicate with the other systems, modules, and/or components connected to or in communication with the home communication center. Further, the processor may: register one or more cellular communication devices with the home communication center; receive, from the femtocell, a call directed to one of the cellular communication devices; determine if a redirection rule applies to the call; if a redirection rule applies to the call, determine a DECT phone to receive the call; determine a phone number for the DECT phone; and, send the call to the DECT interface to call the phone number of the DECT phone.

Other embodiments can include a method for redirecting a call. The method can include a registration module, executed by the processor of the home communication center, registering one or more cellular communication devices with the home communication center. When the home communication center receives a call directed to one of the cellular communication devices, the home communication center can determine if a redirection rule applies to the call. If a redirection rule applies to the call, the home communication center may determine a DECT phone to receive the call, determine a phone number for the DECT phone, and send the call to the phone number of the DECT phone.

The term "communication device" or "communication endpoint" as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 5 and 6.

The term "network" as used herein refers to a system used by one or more users to communicate. The network can consist of one or more session managers, feature servers, communication endpoints, etc. that allow communications, whether voice or data, between two users. A network can be any network or communication system as described in conjunction with FIGS. 5 and 6. Generally, a network can be a local area network (LAN), a wide area network (WAN), a wireless LAN, a wireless WAN, the Internet, etc. that receives and transmits messages or data between devices. A network may communicate in any format or protocol known in the art, such as, transmission control protocol/internet protocol (TCP/IP), 802.11g, 802.11n, Bluetooth, or other formats or protocols.

The term "database" or "data model" as used herein refers to any system, hardware, software, memory, storage device, firmware, component, etc., that stores data. The data model can be any type of database or storage framework described in conjunction with FIGS. 5 and 6, which is stored on any type of non-transitory, tangible computer readable medium. The data model can include one or more data structures, which may comprise one or more sections that store an item of data. A section may include, depending on the type of data structure, an attribute of an object, a data field, or other types of sections included in one or more types of data structures. The data model can represent any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "computer program product" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DESCRIPTION

Figure 1:
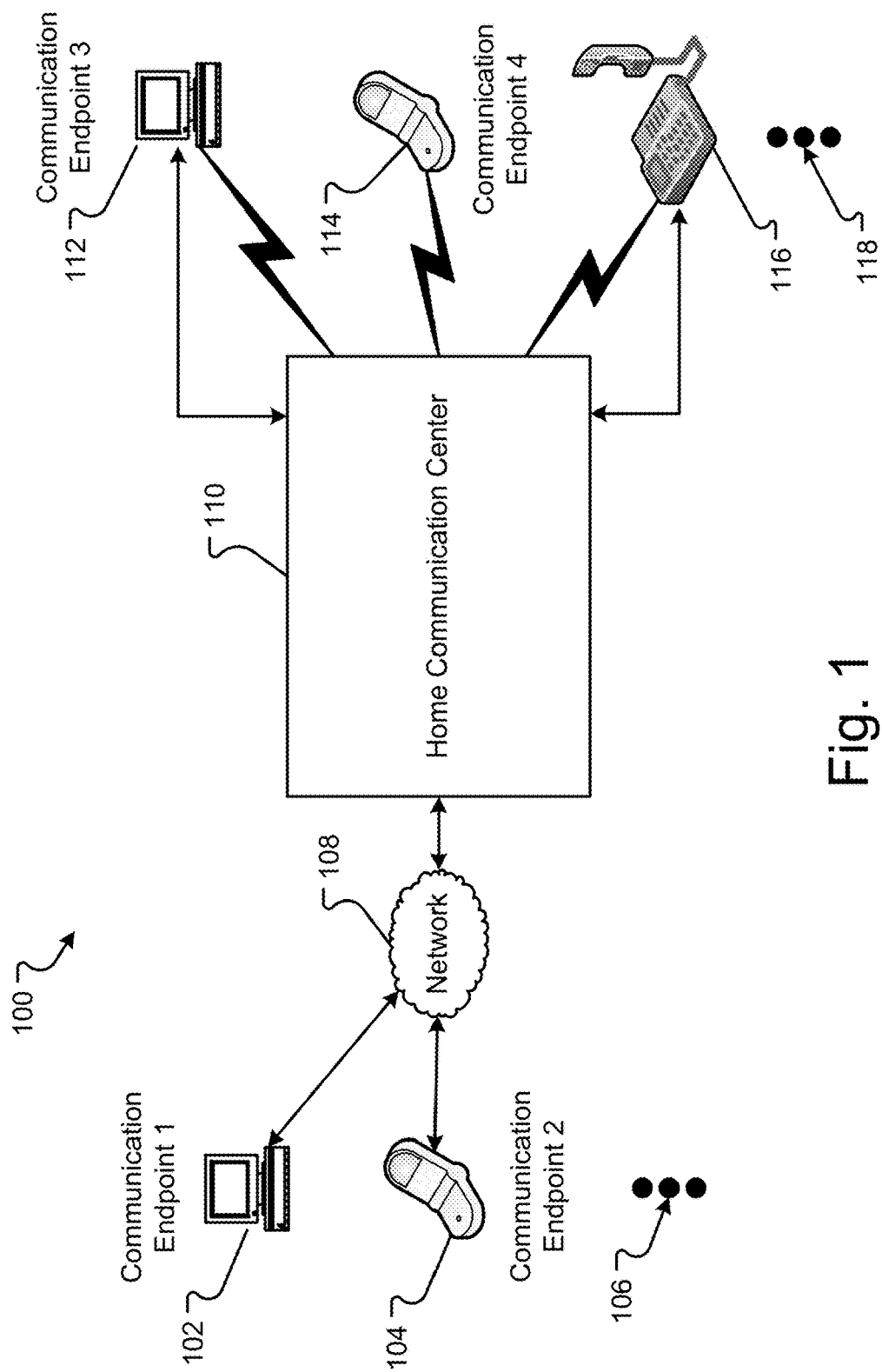
FIG. 1 is a block diagram of an embodiment of the hardware of a communication system including a home communication center.

An integrated home communication environment 100 is shown in FIG. 1. The home communication environment 100 can include a home communication center 110. The home communication center 110 may integrate communications between several different communication devices. For example, the home communication center 110 may receive or send communications between a communication endpoint 3 112, communication endpoint 4 114, and communication endpoint 5 116. These different communication endpoints 112, 114, and/or 116 can include computers, cellular phones, digital enhanced cordless telecommunications (DECT) devices, etc. There may be more or fewer devices than those shown in FIG. 1, as represented by ellipses 118. Further, the communication devices 112, 114, and/or 116 may be different types of devices than those described herein. In embodiments, the home communication center 110 is able to communicate with the various types of devices, integrate the call histories and voicemail systems associated with the devices, and do various other tasks to integrate the different communication systems that the user(s) employs.

The home communication center 110 is further operable to communicate through a network 108 with various remote communication endpoints 102 and/or 104. These communication endpoints 102 and/or 104 may represent distant communicators that are attempting to communicate with a person(s) associated with either a home telephone, for example device 116, and/or a cellular telephone, for example, communication endpoint 114, etc. There may be more or fewer communication endpoints 102 and/or 104 that may attempt to call through the network 108 to the home communication center 110, as represented by ellipses 106.

Figure 2:
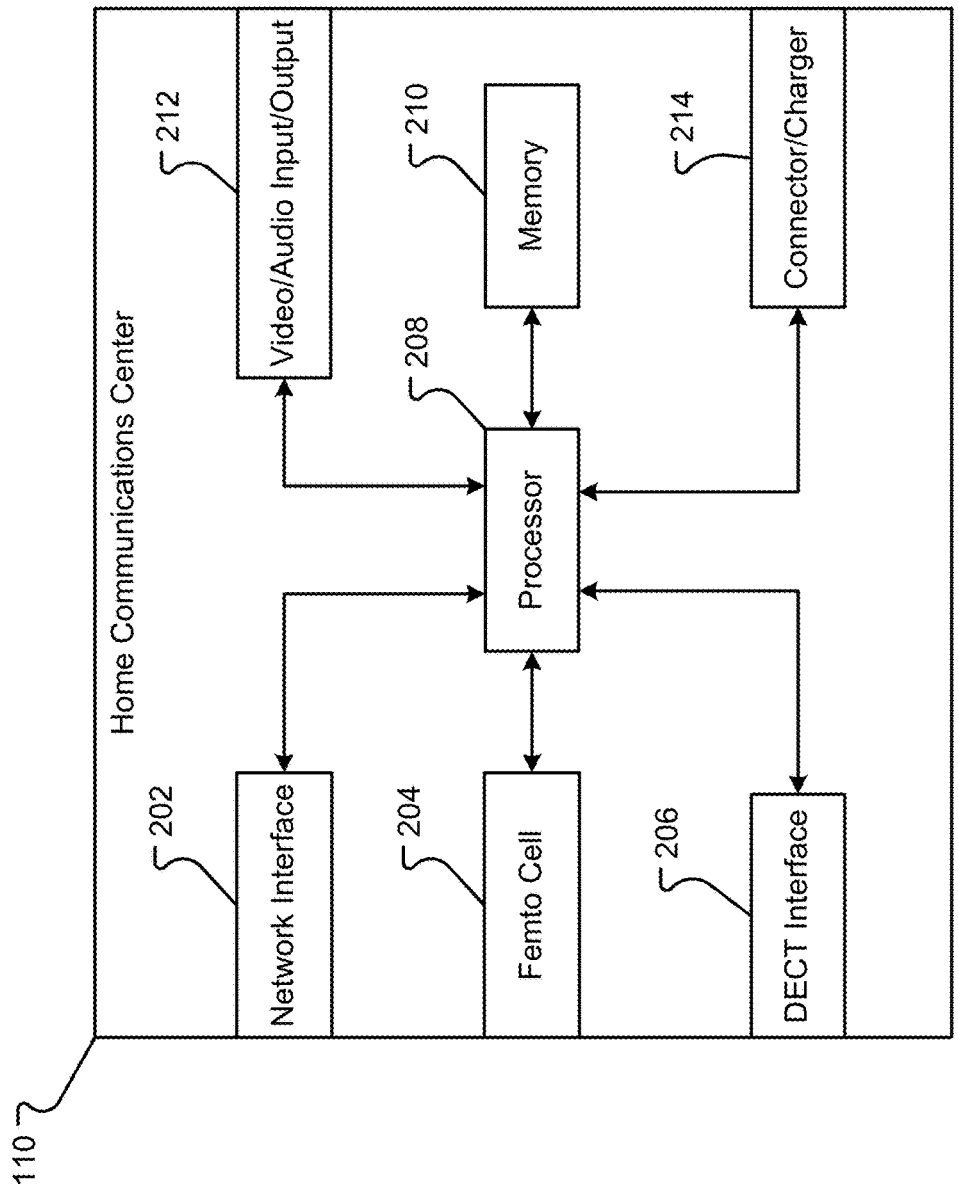
FIG. 2 is a block diagram of an embodiment of the hardware and/or software of the home communication center.

An embodiment of a home communication center 110 is shown in FIG. 2. The home communication center 110 may be a computing device as described in conjunction with FIGS. 5 and 6. Thus, the home communication center 110 can include a processor 208 and memory 210 for executing various software modules or functions, as described herein. The home communication center 110 can also include various other components or software modules operable to conduct different operations. For example, the home communication center 110 can include a network interface 202, a femtocell 204, a DECT interface 206, an audio/video input/output 212, and/or connector/charger 214.

Figure 5:
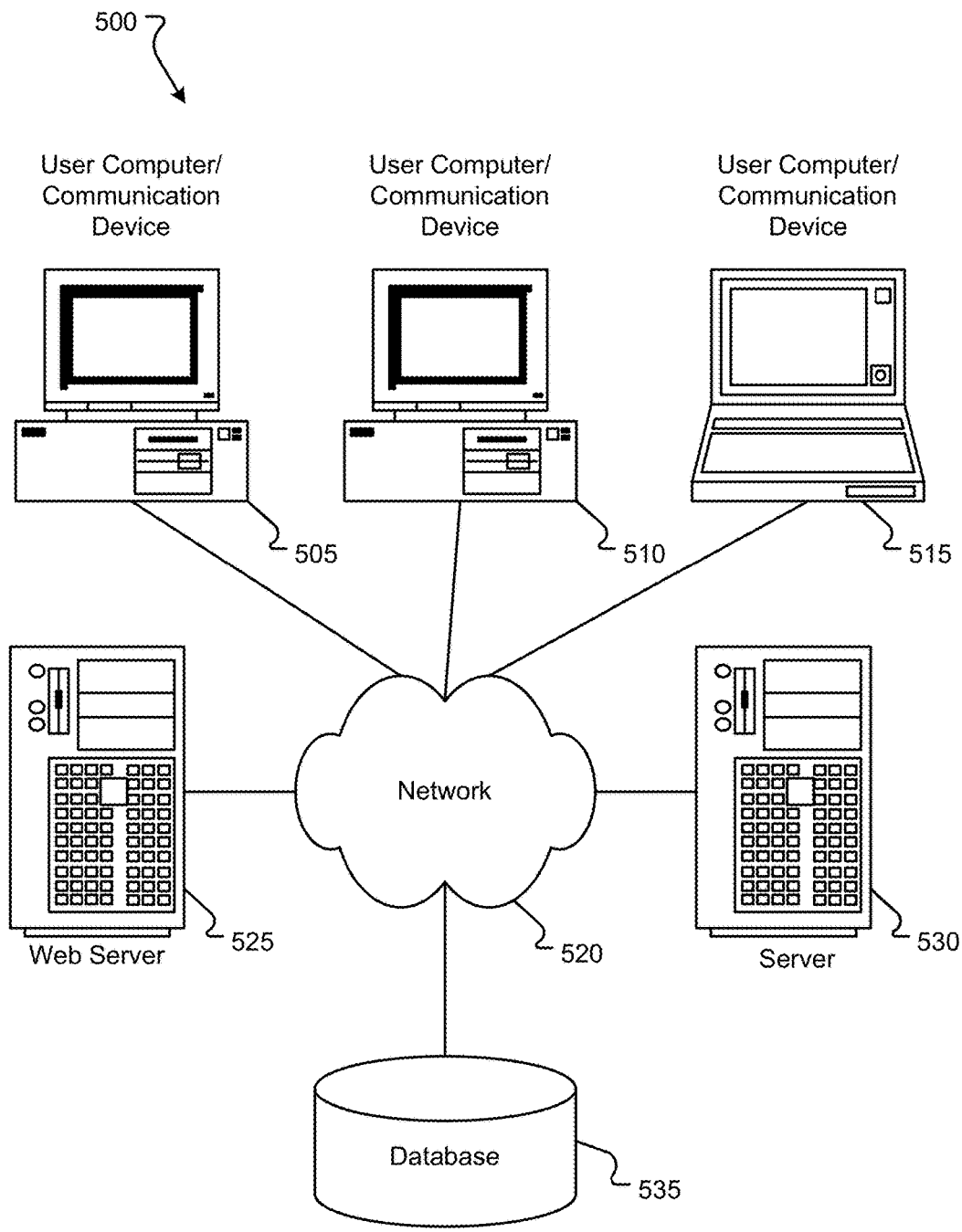
FIG. 5 is a block diagram of an embodiment of a computer system environment in which a home communication center may operate.

The network interface 202 can be any interface to the network 108, as described in conjunction with FIGS. 1, 5, and/or 6. The network interface 202 can include an interface to any type of landline or other communication system including a plain old telephone system (POTS), a public switch telephone network (PSTN), a local area network (LAN), a wide area network (WAN), a wireless LAN, a wireless WAN, or other types of networks that may conduct communications. The network interface 202 can be any hardware and/or software operable to conduct communications over these various types of networks. Thus, the network interface 202 can change communications or format communications in any protocol or format that is sent over these different networks. For example, the network interface 202 may format communications in hypertext transfer protocol (HTTP), realtime transport protocol (RTP), session initiation protocol (SIP), or other types of protocols.

A femtocell 204 can be any femtocell as known in the art. Femtocells generally are considered a small cellular base station that is used in a home or business. The femtocell 204 allows 2 to 4 mobile telephones (e.g., cellular phones) to be registered with the femtocell 204. Thus, the femtocell 204 acts to receive different communications from these registered cellular phones and transmit those communications through a dedicated landline, for example, through the network interface 202 to the network 108. The femtocell 204 can use any type of cellular protocol or technology including CDMA, GSM, LTE, etc. An example of a femtocell 204 may be the 9360 Small Cell, as offered by Alcatel-Lucent. The femtocells 204 may be integrated with the home communication system 110 to receive or transmit cellular telephone calls to the cellular telephone(s) 114.

The home communication center 110 can also include a DECT interface 206. The DECT interface 206 can communicate with one or more cordless phones in the house associated with the home communication center 110. The DECT interface 206 may communicate with the wireless telephones and send the communications through the network interface 202 to the network 108. Thus, the DECT interface 208 is operable to work with any type of wireless telephones that are within range, associated with, and registered to the DECT interface 206.

A video/audio input/output 212 is operable to conduct video or audio calls through the home communication center 110 and route these communications to the femtocell 204, the DECT interface 206, or the network interface 202. Thus, the home communication center 110 can include a camera, speaker, and/or microphone to conduct communications for one or more of the different types of communication devices. The video/audio input/output 212 allows the home communication center 110 to act as its own communication device and use the other communication devices 112, 114, and/or 116 as surrogates for transmitting the communications.

A home communication center 110 can also include one or more connector/chargers 214. Thus, the connector/charger 214 can couple with one or more of the cellular phone 114, DECT phone 116, or other phones to allow those phones to be charged. Further, the connector/charger 214 can be used to communicate to the devices while the devices are connected. Thus, the connector/charger 214 works both to provide power for charging the device and for creating a communication interconnection between the device and the home communication center 110. There may be several connector/chargers 214, each associated with a particular device(s).

Figure 3:
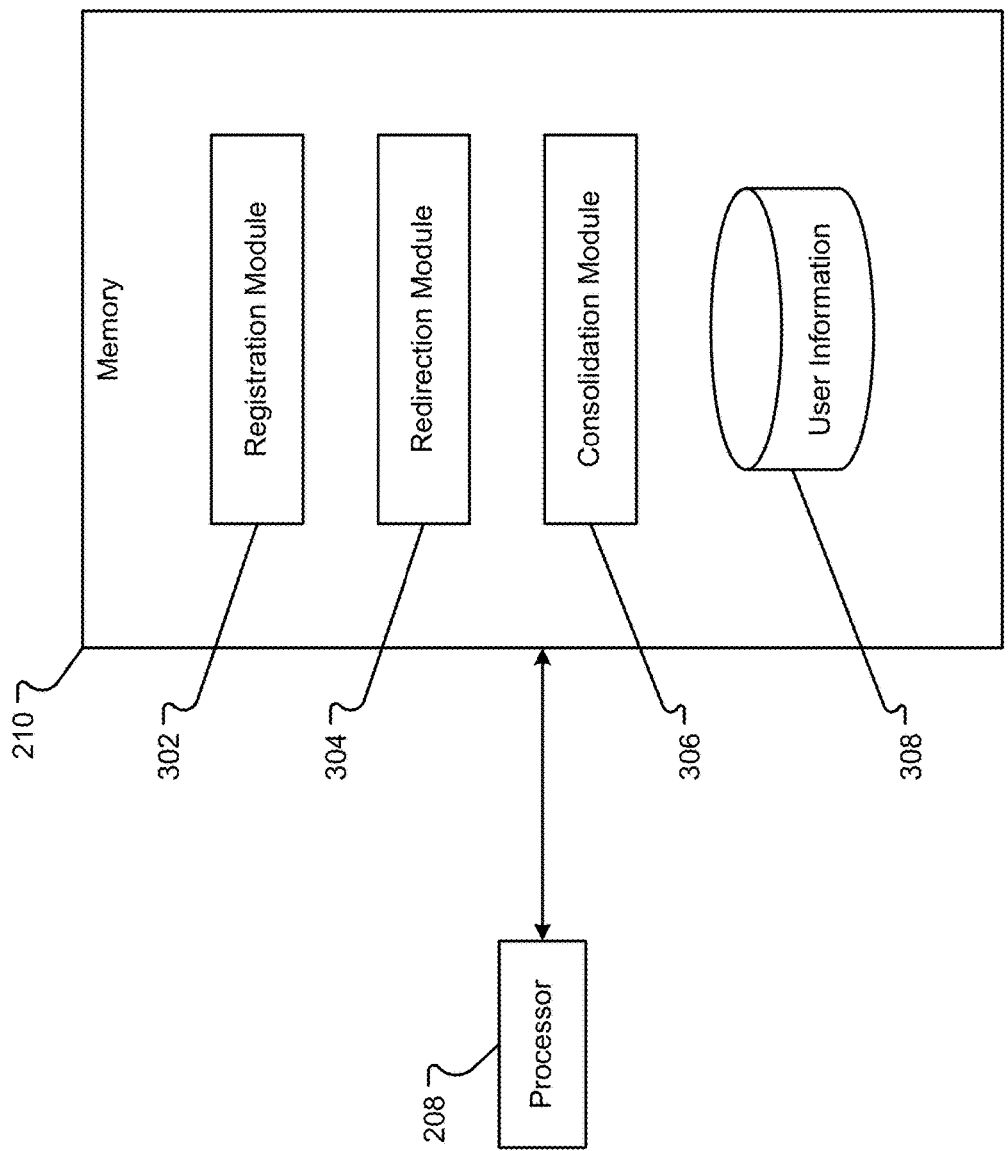
FIG. 3 is a block diagram of an embodiment of the home communication center software and/or firmware.

Embodiments of software modules that may be executed by the processor 208 and stored in memory 210 are shown in FIG. 3. The different software modules may include a registration module 302, a redirection module 304, a consolidation module 306, and a user information database 308. A registration module 302 can register one or more communication devices 112, 114, and/or 116 with the home communication center 110. Thus, the registration module 302 may interface with the different communication devices 112, 114, and/or 116 to receive information about the devices and/or the users that are associated with those devices. The registration module 302 may also determine contact addresses, such as phone numbers, information about how the devices communicate, user names, passwords, and/or other information needed to conduct communications with the devices 112, 114, and/or 116. In embodiments, the registration module 302 may also mine data sources, such as social media (e.g., LinkedIn, Twitter, Facebook, etc.), to determine further information about the users. The registration module 302 may also integrate these communication or social media accounts within the home communication center 110. Registration module 302 can store this information in the database 308. Further, a user(s) may communicate with the registration module 302 to provide information through a user interface; the information may be associated with devices and/or accounts to be or that are registered with the home communication center 110.

The redirection module 304 is operable to redirect calls from one of the communication devices 112, 114, and/or 116, to another one of the communication devices 112, 114, and/or 116. For example, if a cellular telephone call is received at the femtocell 204, for the cellular device 114, the redirection module 304 may determine that the call should be redirected to one of the other devices 112 and/or 116. Thus, the redirection module 304 is operable to redirect any call based on one or more rules or based on input from the call or the called party. The rules may be set by the user or may be standard, automated, and/or conducted similarly across all the different home communication centers 110. In alternative embodiments, the redirection module 304 can present a caller with a menu of who may be called. For example, the redirection module 304 can ask the caller to "Press 1 for Sam Worth," "Press 2 for Tina Worth," etc. The received input can direct the redirection module 304 how to redirect the call (i.e., send the phone call to a particular cellular phone 114).

An example rule used by the redirection module 304 may be that every cellular call is sent to the DECT phones 116. Thus, any person, having a cell phone 114 and registered with the registration module 302, may have all their cellular phones redirected to the home phone 116. This redirection enables the users to use the home phone 116, which may be more comfortable than the cellular phone 114, for answering cellular telephone calls while they are at home. Further, the redirection module 304 may have more complex rules, such as, determining the time of day and whether home telephone calls should be routed to cellular telephones, which may not be at the residence or location of the home communication center 110 at the present time.

The consolidation module 306 is operable to consolidate information for call logs, call histories, voicemail, and other features associated with the different devices 112, 114, and/or 116. Thus, the consolidation module 306 may be operable to interface with the network 108 or other types of systems to provide a central clearing house for information. Consolidation module 306 may then store this user information, in database 308, and may present the information to a computer or other device, for example, device 112. The consolidation module 306, thus, allows the users to have a central clearing house for any information regarding communications used with any of the devices associated and registered with the home communication center 110. Further, the consolidation module 306 may mine information in social media for consolidation, such as, usernames, user identifiers, passwords, communication histories, favorites, likes/dislikes, bookmarks, etc.

The user information database 308 stores all the information collected between the registration module 302, redirection module 304, and/or consolidation module 306. User information can include user names, phone numbers, redirection rules, or other information used with the home communication center 110. The user information database 308 operates to consolidate and combine communications media information for the user(s).

Figure 4:
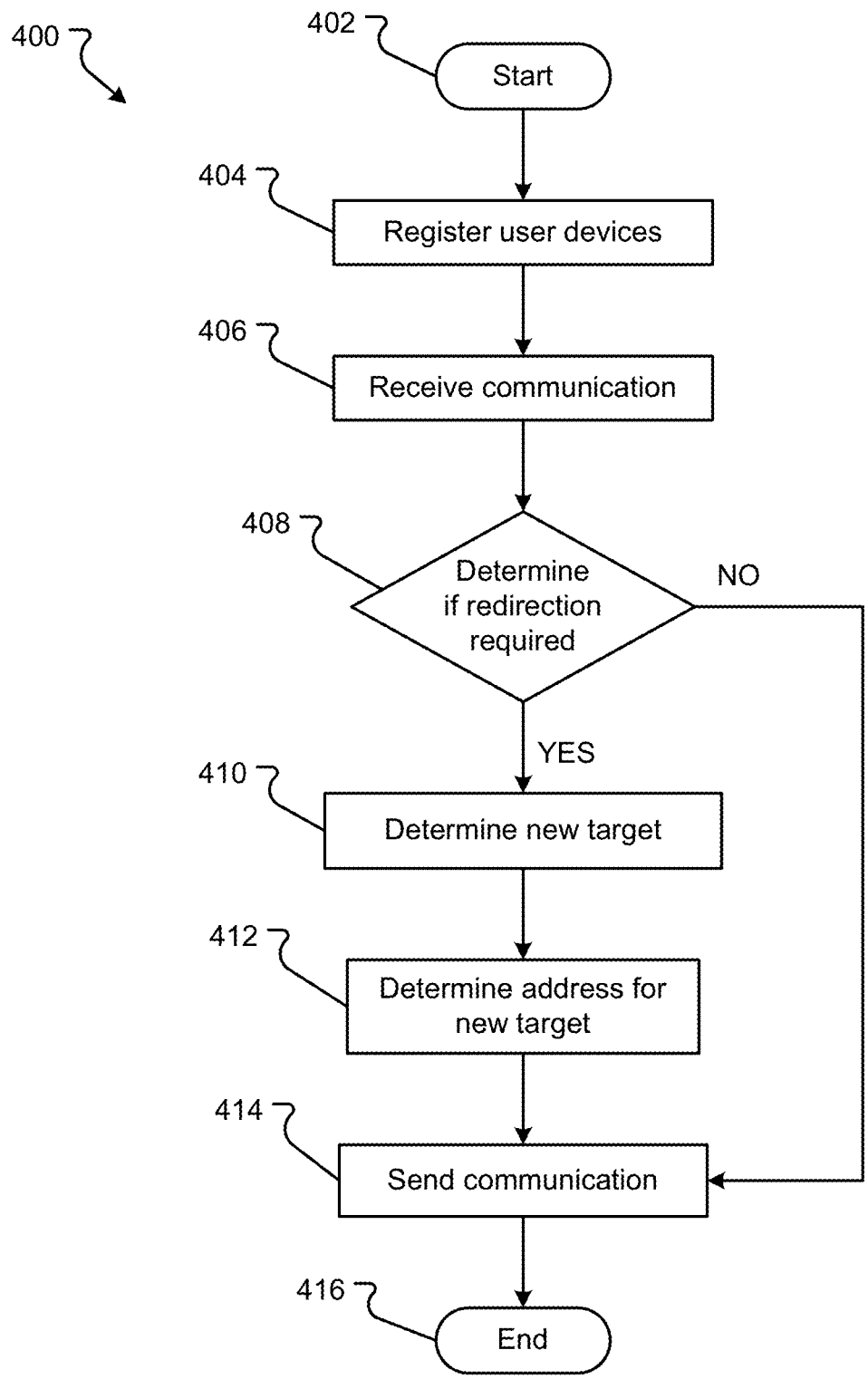
FIG. 4 is a flow chart of an embodiment of a method for redirecting calls with a home communication center.

An embodiment of a method 400 for operating a home communication center 110 is shown in FIG. 4. While a general order for the steps of the method 400 is shown in FIG. 4, the method 400 may be conducted in a different order or arrangement of steps. Generally, the method 400 starts with a start operation 402 and ends with an end operation 416. The method 400 can include more or fewer steps than those shown in FIG. 4. The method 400 can be executed as a set of computer-executable instructions executed by a computer system and encoded or stored on a computer readable medium. Hereinafter, the method 400 shall be explained with reference to the systems, components, modules, software, data structures, user interfaces, etc. described in conjunction with FIGS. 1-3.

In embodiments, the registration module 302 of the home communication center 110 registers a user device(s), in step 404. Thus, the registration module 302 obtains information about the communication devices 112, 114, and/or 116, such as the phone number or the communication address of the phone, the type of phone, how to communicate with the phone, the user(s) associated with the device, the user's name or other identifier(s), the user's address, and other information. This collected information can be stored in the information database 308.

After the device(s) is registered with the registration module 302, the home communication center 110 can receive a communication, in step 406. The communication may be through the network interface 202, the femtocell 204, or the DECT interface 206. The communication may be incoming or outgoing and may be directed to one or more of the communication devices 112, 114, and/or 116 or from one or more of the communication devices 112, 114 and/or 116. In embodiments, the communication can include metadata, such as the identifier of the device to which the communication is directed. Further, other metadata may be determined from other sources, for example, the time of the call may be determined from a separate clock.

The redirection module 304 may then determine if redirection is required, in step 408. Depending on the type of call, the time the call is received, who the call is directed to, or other information, the redirection module 304 can determine whether redirection is required. To determine if redirection is required, the redirection module 304 may receive metadata associated with the call, caller, etc., retrieve one or more redirection rules from the user information database 308 and determine if the call applies to one of the redirection rules. Thus, the redirection module 304 locates the identifier for the caller in the database 308 and determines if a redirection rule is associated with the called device. Further, the redirection module 304 may also apply other metadata to determine if the redirection rule applies (e.g., is the time of the call within a time period when the redirection rule should be applied). For example, if the call is sent to a certain cellular device and a redirection rule states that all calls, directed to a cell phone 114, are to be redirected to the home phone 116, the redirection module 304 may operate to redirect the call to the home communications devices 116 rather than or in conjunction with ringing the cell phone 114. If redirection is required, step 408 proceeds YES to step 410. If redirection is not required, step 408 proceeds NO to step 414.

In step 410, the redirection module 304 determines the new target. Based on the redirection rule and/or the metadata about the call, the redirection module 304 can determine to which device 112, 114, and/or 116 to redirect the communication. For example, if the call is directed to a cell phone 114 and is supposed to be redirected to a home phone 116, the redirection module 304 can determine that the home phone 116 is the new target.

The redirection module 304 may then determine the address for the new target, in step 412. Upon determining the new target, the redirection module 304 can access information in the user database 308 to determine what is the phone number, IP address, or other address for the other communication device. The determined address for the new target may then be used by the redirection module 304 to send the communication to that new target, in step 414. If no redirection is required, the redirection module 304 of the home communication center 110 can just forward the communication to the original target, in step 414.

FIG. 5 illustrates a block diagram of a computing environment 500 that may function as system or environment for the embodiments described herein. The system 500 includes one or more user computers 505, 510, and 515. The user computers 505, 510, and 515 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 505, 510, 515 may also have any of a variety of applications, including for example, database client and/or server applications, and web browser applications. Alternatively, the user computers 505, 510, and 515 may be any other electronic device, such as a thin-client computer, Internet-enabled mobile telephone, and/or personal digital assistant, capable of communicating via a network (e.g., the network 520 described below) and/or displaying and navigating web pages or other types of electronic documents. Although the exemplary system 500 is shown with three user computers, any number of user computers may be supported.

System 500 further includes a network 520. The network 520 can be any type of network familiar to those skilled in the art that can support data communications using any of a variety of commercially-available protocols, including, without limitation, TCP/IP, SNA, IPX, AppleTalk, and the like. Merely by way of example, the network 520 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 500 may also include one or more server computers 525, 530. One server may be a web server 525, which may be used to process requests for web pages or other electronic documents from user computers 505, 510, and 515. The web server can be running an operating system including any of those discussed above, as well as any commercially-available server operating systems. The web server 525 can also run a variety of server applications, including HTTP servers, FTP servers, CGI servers, database servers, Java servers, and the like. In some instances, the web server 525 may publish operations available operations as one or more web services.

The system 500 may also include one or more file and or/application servers 530, which can, in addition to an operating system, include one or more applications accessible by a client running on one or more of the user computers 505, 510, 515. The server(s) 530 may be one or more general purpose computers capable of executing programs or scripts in response to the user computers 505, 510 and 515. As one example, the server may execute one or more web applications. The web application may be implemented as one or more scripts or programs written in any programming language, such as Java™, C, C#™ or C++, and/or any scripting language, such as Perl, Python, MySQL, or TCL, as well as combinations of any programming/scripting languages. The application server(s) 530 may also include database servers, including without limitation those commercially available from Oracle, Microsoft, Sybase™, IBM™ and the like, which can process requests from database clients running on a user computer 505.

The web pages created by the web application server 530 may be forwarded to a user computer 505 via a web server 525. Similarly, the web server 525 may be able to receive web page requests, web services invocations, and/or input data from a user computer 505 and can forward the web page requests and/or input data to the web application server 530. In further embodiments, the server 530 may function as a file server. Although for ease of description, FIG. 5 illustrates a separate web server 525 and file/application server 530, those skilled in the art will recognize that the functions described with respect to servers 525, 530 may be performed by a single server and/or a plurality of specialized servers, depending on implementation-specific needs and parameters. The computer systems 505, 510, and 515, file server 525 and/or application server 530 may function as servers or other systems described herein.

The system 500 may also include a database 535. The database 535 may reside in a variety of locations. By way of example, database 535 may reside on a storage medium local to (and/or resident in) one or more of the computers 505, 510, 515, 525, 530. Alternatively, it may be remote from any or all of the computers 505, 510, 515, 525, 530, and in communication (e.g., via the network 520) with one or more of these. In a particular set of embodiments, the database 535 may reside in a storage-area network ("SAN") familiar to those skilled in the art. Similarly, any necessary files for performing the functions attributed to the computers 505, 510, 515, 525, 530 may be stored locally on the respective computer and/or remotely, as appropriate. In one set of embodiments, the database 535 may be a relational database, such as Oracle 10i™, that is adapted to store, update, and retrieve data in response to SQL-formatted commands. Database 535 may be the same or similar to the database used herein.

Figure 6:
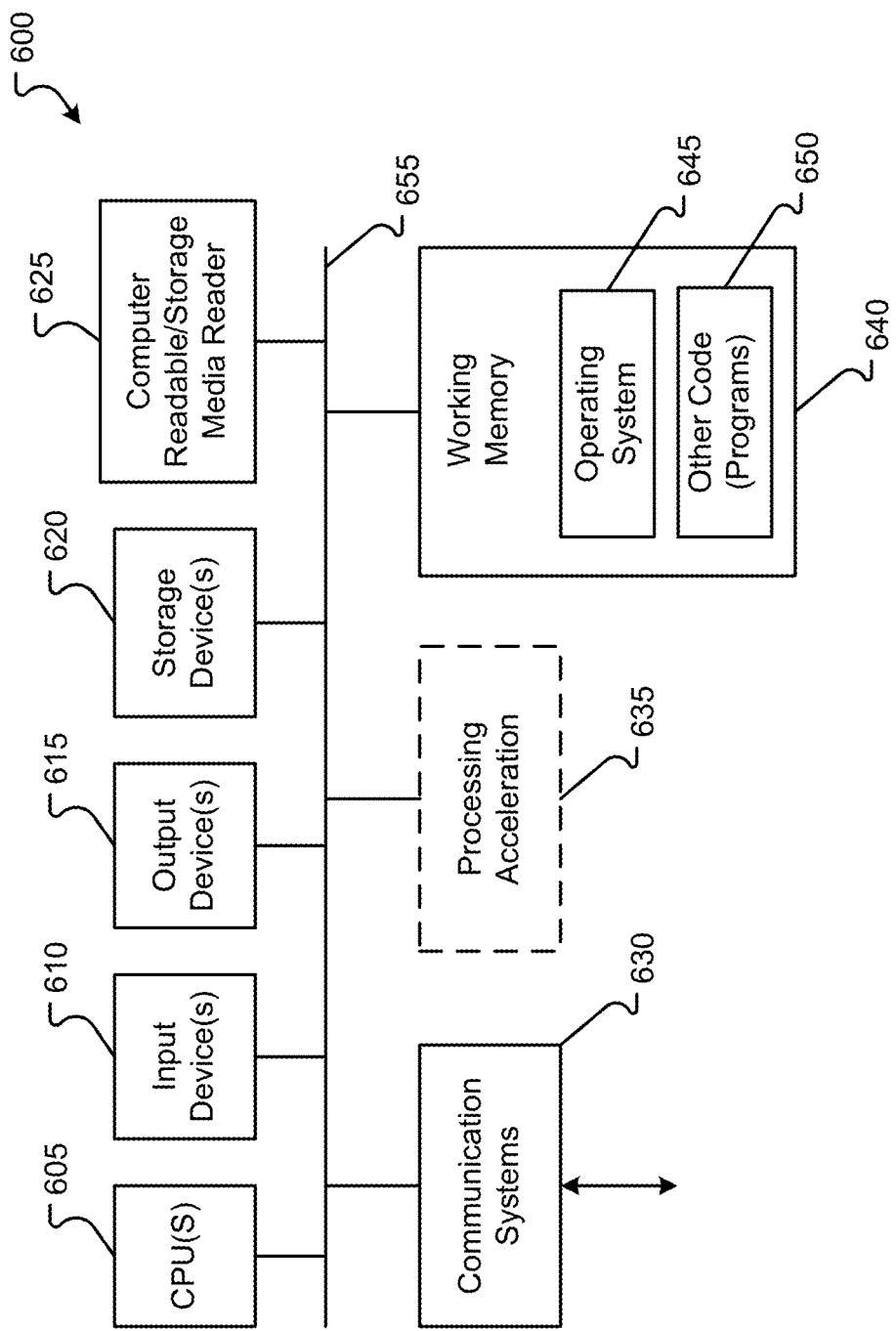
FIG. 6 is a block diagram of an embodiment of a computer system that may function as a home communication center.

FIG. 6 illustrates one embodiment of a computer system 600 upon which servers or other systems described herein may be deployed or executed. The computer system 600 is shown comprising hardware elements that may be electrically coupled via a bus 655. The hardware elements may include one or more central processing units (CPUs) 605; one or more input devices 610 (e.g., a mouse, a keyboard, etc.); and one or more output devices 615 (e.g., a display device, a printer, etc.). The computer system 600 may also include one or more storage device 620. By way of example, storage device(s) 620 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 625; a communications system 630 (e.g., a modem, a network card (wireless or wired), an infra-red communication device, etc.); and working memory 640, which may include RAM and ROM devices as described above. In some embodiments, the computer system 600 may also include a processing acceleration unit 635, which can include a DSP, a special-purpose processor and/or the like.

The computer-readable storage media reader 625 can further be connected to a computer-readable storage medium, together (and, optionally, in combination with storage device(s) 620) comprehensively representing remote, local, fixed, and/or removable storage devices plus storage media for temporarily and/or more permanently containing computer-readable information. The communications system 630 may permit data to be exchanged with the network 620 and/or any other computer described above with respect to the system 600. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 600 may also comprise software elements, shown as being currently located within a working memory 640, including an operating system 645 and/or other code 650, such as program code implementing the servers or devices described herein. It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Figure 7:
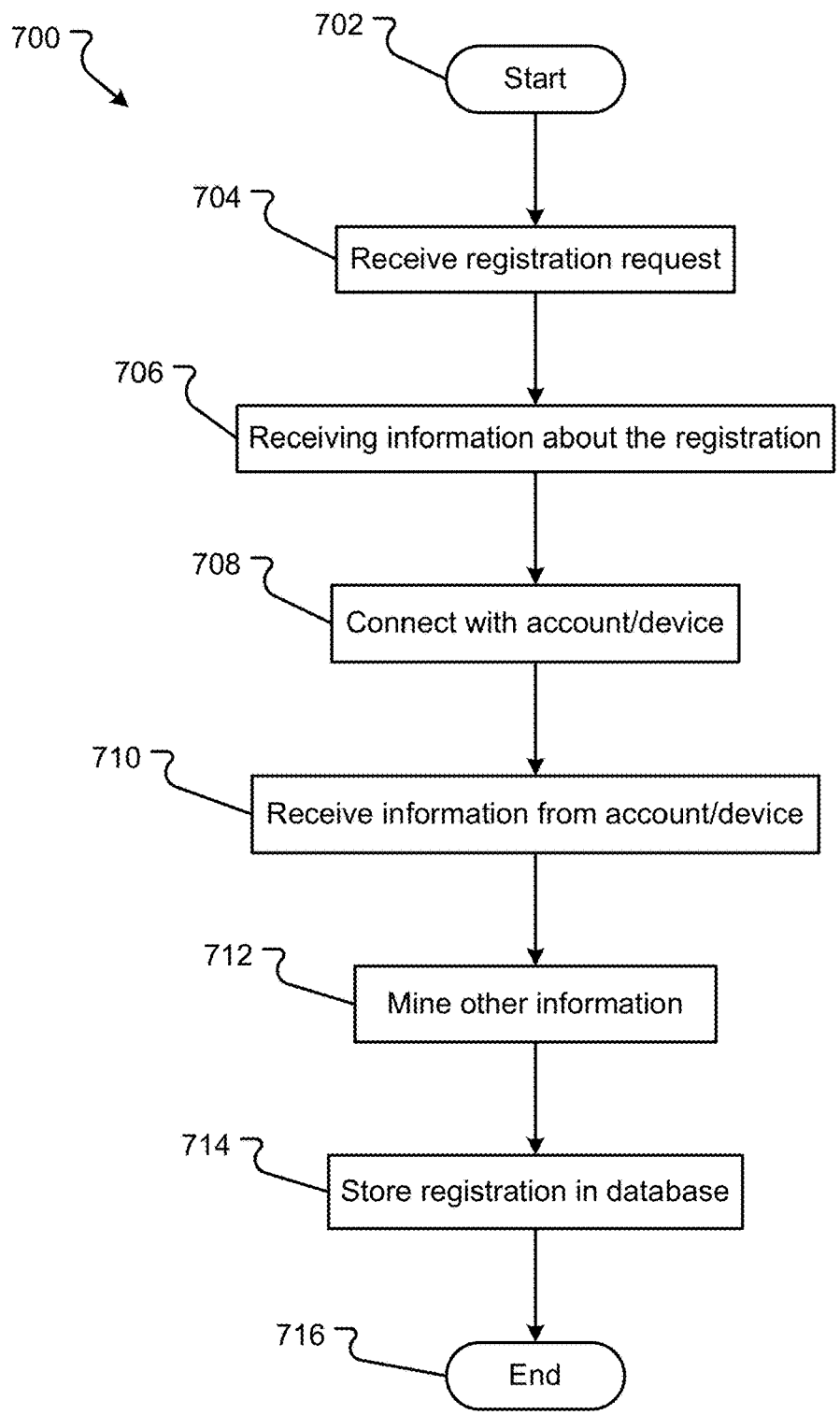
FIG. 7 is a flow chart of an embodiment of a method for registering devices with a home communication center.

An embodiment of a method 700 for operating a home communication center 110 is shown in FIG. 7. While a general order for the steps of the method 700 is shown in FIG. 7, the method 700 may be conducted in a different order or arrangement of steps. Generally, the method 700 starts with a start operation 702 and ends with an end operation 716. The method 700 can include more or fewer steps than those shown in FIG. 7. The method 700 can be executed as a set of computer-executable instructions executed by a computer system and encoded or stored on a computer readable medium. Hereinafter, the method 700 shall be explained with reference to the systems, components, modules, software, data structures, user interfaces, etc. described in conjunction with FIGS. 1-6.

The home communication center 110 may receive a registration request, in step 704. The registration request may be automated when a new device is first identified by the home communication center 110 or is first connected to the home communication center 110. The registration request may be received by the registration module 302 through an interface and/or connector 202, 204, 206, and/or 214. The automated registration request may be as a result of a discovery process for obtaining an IP address, creating a BLUETOOTH™ connection, or some other process. In other embodiments, a user may provide the registration request through a user interface. For example, a user may request registration through a user interface to the home communication center 110. Upon selecting a user interface device, a new user interface may be provided for the registration request. Information about the registration request may then be input by the user through the provided user interface.

The registration module 302 may then receive information about the registration, in step 706. With a provided user interface, a user may provide information about the registration. For example, the information can include account identifiers, passwords, device identifiers, which people are associated with the device(s) and/or account(s), etc. The information may allow the registration module 302 to communicate with the device(s) and/or account(s) to obtain further information.

In embodiments, using the provided information, the registration module 302 can connect with the device(s) and/or account(s), in step 708. The connection can include any steps to communicate with and gain access to the device(s) and/or account(s). After connections with the device(s) and/or account(s), the registration module 302 may then receive or extract information from the device(s) and/or account(s), in step 710. The information may be transmitted automatically from a device 112, 114, and/or 116 or an account (e.g., a Facebook account, Twitter account, etc.) to the registration module 302. The information may be sent via the interface and/or connector 202, 204, 206, and/or 214.

After receiving any available information, the registration module 302 may mine for further information, in step 712. Mining for information may include using metadata, content, or other data associated with the provided information to define a context to the registration. The mined information can include other social media accounts, address books or contact lists, call logs, when calls are received and sent from the device, where the user(s) is when receiving communications, GPS information, etc. Any mined information can be stored with the provided information in the database 308, in step 714.

Figure 8:
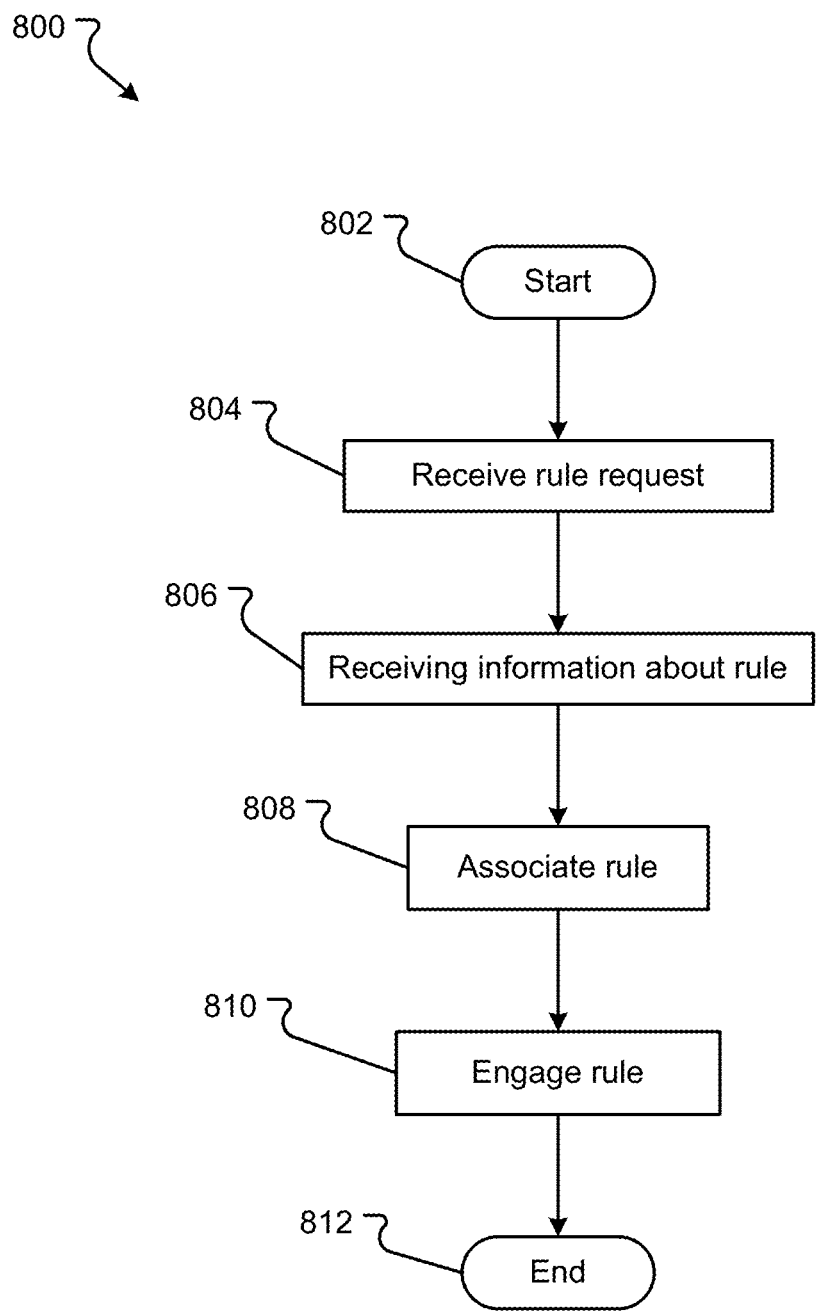
FIG. 8 is a flow chart of an embodiment of a method for creating redirect rules with a home communication center.

An embodiment of a method 800 for operating a home communication center 110 is shown in FIG. 8. While a general order for the steps of the method 800 is shown in FIG. 8, the method 800 may be conducted in a different order or arrangement of steps. Generally, the method 800 starts with a start operation 802 and ends with an end operation 812. The method 800 can include more or fewer steps than those shown in FIG. 8. The method 800 can be executed as a set of computer-executable instructions executed by a computer system and encoded or stored on a computer readable medium. Hereinafter, the method 800 shall be explained with reference to the systems, components, modules, software, data structures, user interfaces, etc. described in conjunction with FIGS. 1-7.

The home communication center 110 may receive a rule request, in step 804. In embodiments, a user may provide the rule request through a user interface. For example, a user may request to manage, change, or create a rule through a user interface to the home communication center 110. Upon selecting a user interface device, a new user interface may be provided for the rule request. Information about the rule request may then be input by the user through the provided user interface.

The redirection module 304 may then receive information about the redirection rule, in step 806. With a provided user interface, a user may provide information about the rule request. For example, the information can include an identifier for the rule, when the rule should be active, to which devices the rule should be associated, to which users the rule should be associated, the redirection targets for the rule, and other data or metadata for the rule. The information may allow the redirection module 304 to determine if a communication or call is associated with the rule and whether the rule should be executed or followed.

In embodiments, using the provided information, the redirection module 304 can associate the rule with one or more of the device(s), user(s), and/or account(s), in step 808. The association ensures that when a communication is received for the device(s), user(s), and/or account(s) the rule will be followed. To associate a rule, a database structure may be created that stores a pointer to the rule with the identifiers for the device(s), user(s), and/or account(s). After the association is made and the rule stored in database 308, the redirection module 304 may then engage the rule, in step 810. Engaging the rule means the rule is activated and will be followed when the redirection rule applies to a communication(s) or a call(s).

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a tablet-like device, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A non-transitory computer readable medium having stored thereon computer executable instructions which, when executed by a processor of a home communication center, causes the home communication center to perform a method for redirecting a phone call, the instructions comprising:
 instructions to register one or more communication devices with the home communication center including:
  instructions to receive a registration request,
  instructions to receive information about the registration request, wherein the information includes a name of a user associated with the one or more communication devices and a password for a network account of the user,
  instructions to connect with the one or more communication devices associated with the registration request,
  instructions to receive information about the network account or one or more communication devices associated with the registration request,
  based on the received information, instructions to mine for other information associated with the registration request, wherein the mining comprises extracting information from a social media account of the user, and
  instructions to store the received information and the mined information in a database of the home communication center such that the social media account for the user is associated with one or more of the network account of the user or the one or more communication devices;
 instructions to connect the home communication center to the network account associated with the user of the registered one or more communication devices;
 instructions to receive, by the home communication center and after registering the one or more communication devices, a phone call directed to the registered one or more communication devices, the phone call including metadata;
 instructions to receive the metadata associated with the received phone call, wherein the metadata includes an identifier for the registered one or more communication devices to which the received phone call is directed, a type of call, a time the received phone call is received, and to whom the received phone call is directed;
 instructions to determine, by the home communication center, if the metadata is associated with a redirection rule stored in a database, wherein the redirection rule includes at least two of an identifier for the redirection rule, information about when the redirection rule should be active, to which devices the redirection rule should be associated, to which users the redirection rule should be associated, and redirection targets for the redirection rule;
 based on the determination if the metadata is associated with the redirection rule, instructions to retrieve, by the home communication center, the redirection rule that applies to the received phone call;
 if a redirection rule applies to the phone call, instructions to determine a new target for the phone call, wherein the new target is a different one of the registered one or more communication devices;
 instructions to determine an address for the new target; and
 instructions to send the phone call to the address of the new target.

2. The computer readable medium as defined in claim 1, wherein the phone call is directed to a cellular communication device.

3. The computer readable medium as defined in claim 2, wherein the new target is a DECT phone.

4. The computer readable medium as defined in claim 3, wherein the metadata includes an identifier for the cellular communication device.

5. The computer readable medium as defined in claim 4, wherein the instructions to determine if a redirection rule applies to the phone call comprise:

instructions to locate the identifier in a database of the home communication center; and instructions to determine if the redirection rule is associated with the identifier in the database.

6. The computer readable medium as defined in claim 5, wherein the instructions to determine if a redirection rule applies to the phone call further comprise instructions to determine if the phone call is received within a time period in which the redirection rule should be applied to the phone call.

7. The computer readable medium as defined in claim 1, further comprising:
instructions to receive a rule request;
instructions to receive information about the redirection rule associated with the rule request, wherein the information includes at least one of a time when the redirection rule is active and to which users the redirection rule applies;
instructions to associate the redirection rule with one or more accounts, users, and devices; and
instructions to engage the rule, wherein an identifier for one or more accounts, users, and devices is stored in association with the redirection rule.

8. The computer readable medium as defined in claim 1, further comprising adding the phone call to a call log of the one or more communication devices registered with the home communication center.

9. A method for redirecting a call, comprising:
registering, by a registration module of a home communication center, one or more cellular communication devices with the home communication center, wherein the registering includes:
receiving a registration request,
receiving information about the registration request, wherein the information includes a name of a user associated with the one or more cellular communication devices and a password for a network account of the user,
connecting with the one or more cellular communication devices associated with the registration request,
receiving information about the network account or one or more cellular communication devices associated with the registration request,
based on the received information, mining for other information associated with the registration request, wherein the mining comprises extracting information from a social media account of the user, and
storing the received information and the mined information in a database of the home communication center such that the social media account for the user is associated with one or more of the network account of the user or the one or more cellular communication devices;
receiving, by the home communication center, a phone call directed to the one or more cellular communication devices;
receiving, by the home communication center, the metadata associated with the received phone call, wherein the metadata includes an identifier for the one or more communication devices to which the received phone call is directed, a type of call, a time the received phone call is received, and to whom the received phone call is directed;
determining, by the home communication center, if the metadata is associated with a redirection rule stored in a database, wherein the redirection rule includes at least two of an identifier for the redirection rule, information about when the redirection rule should be active, to which devices the redirection rule should be associated, to which users the redirection rule should be associated, and redirection targets for the redirection rule;
based on the determination if the metadata is associated with the redirection rule, retrieving, by the home communication center, the redirection rule that applies to the phone call;
if a redirection rule applies to the phone call, determining a DECT phone to receive the phone call;
determining a phone number for the DECT phone; and
sending the phone call to the phone number of the DECT phone.

10. The method defined in claim 9, wherein a redirection module executed by the processor of the home communication center receives metadata about the phone call.

11. The method defined in claim 9, wherein a consolidation module executed by the processor consolidates one or more of call logs and voicemail of one or more communication devices registered with the home communication center.

12. The method defined in claim 9, further comprising:
a redirection module executed by the processor of the home communication center receiving a rule request;
the redirection module receiving information about the redirection rule associated with the rule request, the information including a time when the redirection rule is active;
the redirection module associating the redirection rule with one or more accounts, users, and devices; and
the redirection module engaging the rule.

13. A home communication center, comprising:
a femtocell to send or receive cellular communications;
a DECT interface to send or receive wireless phone communications;
a network interface to send or receive communications over a landline;
a video/audio input/output to receive video and audio for a call and operable to provide audio to a speaker for a user;
at least one connector/charger to physically connect with a cellular phone, to communicatively couple with the cellular phone, and to charge the cellular phone;
a memory; and
a processor in communication with the femtocell, the DECT interface, the network interface, the video/audio input/output, and the at least one connector/charger, the processor operable to:
register one or more cellular communication devices with the home communication center, wherein during a registration process, the processor is operable to:
receive a registration request,
receive information about the registration request, wherein the information includes a name of a user associated with the one or more cellular communication devices and a password for a network account of the user,
connect with the one or more cellular communication devices associated with the registration request,
receive information about the network account or one or more cellular communication devices associated with the registration request,
based on the received information, mine for other information associated with the registration request, wherein the mining comprises extracting information from a social media account of the user, and store the received information and the mined information in a database of the home communication center such that the social media account for the user is associated with one or more of the network account of the user or the one or more cellular communication devices;

receive, from the femtocell, a call directed to the registered one or more cellular communication devices;

receive metadata associated with the call, wherein the metadata includes an identifier for the communication device to which the received phone call is directed, a type of call, a time the received phone call is received, and to whom the received phone call is directed;

determine if the metadata is associated with a redirection rule stored in a database, wherein the redirection rule includes at least two of an identifier for the redirection rule, information about when the redirection rule should be active, to which devices the redirection rule should be associated, to which users the redirection rule should be associated, and redirection targets for the redirection rule;

retrieve the redirection rule that applies to the call;

if a redirection rule applies to the call, determine a DECT phone to receive the call; determine a phone number for the DECT phone;

send the call to the DECT interface to call the phone number of the DECT phone; and store information associated with the call in a database of the home communication center.

14. The home communication center as defined in claim 13, wherein the call includes at least one item of metadata, and wherein the at least one item of metadata includes an identifier for the registered one or more cellular communication devices.

15. The home communication center as defined in claim 14, wherein when determining if a redirection rule applies to the call, the processor is operable to:
locate the identifier in the database of the home communication center;
determine if the redirection rule is associated with the identifier in the database; and
apply one or more other items of metadata to the redirection rule to determine if the redirection rule applies to the call.

16. The home communication center defined in claim 13, wherein the processor is further operable to:
receive a rule request;
receive information about the redirection rule associated with the rule request, wherein the information includes users to which the redirection rule applies;
associate the redirection rule with one or more accounts, users, and devices; and
engage the rule.

* * * * *